United States Patent
Kikuchi et al.

(10) Patent No.: US 11,312,840 B2
(45) Date of Patent: Apr. 26, 2022

(54) ORGANIC-INORGANIC HYBRID COMPOSITION, AND ARTICLE AND OPTICAL COMPONENT INCLUDING THE SAME

(71) Applicant: SAMSUNG ELECTRONICS CO., LTD., Suwon-si (KR)

(72) Inventors: Tomoyuki Kikuchi, Yokohama (JP);
Yoshiyuki Oishi, Morioka (JP);
Ryosuke Kamitani, Yokohama (JP);
Yukika Yamada, Yokohama (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 334 days.

(21) Appl. No.: 16/549,907

(22) Filed: Aug. 23, 2019

(65) Prior Publication Data
US 2020/0062927 A1 Feb. 27, 2020

(30) Foreign Application Priority Data

Aug. 24, 2018 (JP) .............................. JP2018-157476
Jul. 2, 2019 (KR) ........................ 10-2019-0079637

(51) Int. Cl.
| | |
|---|---|
| C08K 9/06 | (2006.01) |
| C08G 75/04 | (2016.01) |
| G02B 1/04 | (2006.01) |
| C08K 3/22 | (2006.01) |

(52) U.S. Cl.
CPC ............... *C08K 9/06* (2013.01); *C08G 75/04* (2013.01); *C08K 3/22* (2013.01); *G02B 1/041* (2013.01); *C08K 2003/2244* (2013.01)

(58) Field of Classification Search
CPC .... C08K 9/06; C08K 2003/2244; C08K 3/22; C08G 75/04; G02B 1/041
USPC ....................................................... 524/100
See application file for complete search history.

(56) References Cited

U.S. PATENT DOCUMENTS

| | | | |
|---|---|---|---|
| 6,569,916 B2 | 5/2003 | Kim | |
| 8,520,124 B2 | 8/2013 | Ozaki | |
| 9,036,275 B2 | 5/2015 | Fukuta et al. | |
| 9,534,144 B2 | 1/2017 | Kato et al. | |
| 9,823,443 B2 | 11/2017 | Lee et al. | |
| 10,174,164 B2 | 1/2019 | Nishimura et al. | |
| 2014/0371367 A1* | 12/2014 | Nishimura | C09D 179/04 524/413 |
| 2015/0299512 A1 | 10/2015 | Kato et al. | |
| 2017/0362382 A1 | 12/2017 | Nishimura et al. | |

FOREIGN PATENT DOCUMENTS

| | | |
|---|---|---|
| JP | 3146334 B2 | 3/2001 |
| JP | 2002115098 A | 4/2002 |
| JP | 2002255945 A | 9/2002 |
| JP | 3420716 B2 | 6/2003 |
| JP | 2004167687 A | 6/2004 |
| JP | 3690975 A | 6/2005 |
| JP | 3967828 B2 | 8/2007 |
| JP | 2007204739 A | 8/2007 |
| JP | 2008045109 A | 2/2008 |
| JP | 2009001658 A | 1/2009 |
| JP | 2009029939 A | 2/2009 |
| JP | 2009197178 A | 9/2009 |
| JP | 2012097175 A | 5/2012 |
| JP | 4973093 B2 | 7/2012 |
| JP | 2014141596 A | 8/2014 |
| JP | 2014162829 A | 9/2014 |
| JP | 2014162830 A | 9/2014 |
| JP | 2014169464 A | 9/2014 |
| JP | 5701474 B2 | 4/2015 |
| JP | 6020468 B2 | 11/2016 |
| JP | 2017110133 A | 6/2017 |
| JP | 2017116774 A | 6/2017 |
| KR | 101580748 B1 | 12/2015 |
| KR | 1020160112307 A | 9/2016 |
| WO | 2011021271 A1 | 2/2011 |
| WO | 2013094663 A1 | 6/2013 |

* cited by examiner

*Primary Examiner* — Hui H Chin
(74) *Attorney, Agent, or Firm* — Cantor Colburn LLP

(57) ABSTRACT

An organic-inorganic hybrid composition including a polymer having a triazine ring structure in a main chain of the polymer (A);
an inorganic particulate (B); and a surface-treating agent having a triazine ring structure represented by Formula (1)(C):

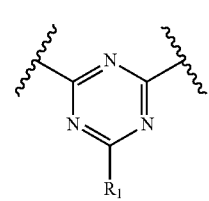

(1)

wherein, in Formula (1), $R_1$ is a carboxyl group, a phosphoric acid group, a sulfo group, or a substituted or unsubstituted alkyl group, a substituted or unsubstituted alkenyl group, a substituted or unsubstituted alkynyl group, a substituted or unsubstituted aryl group, a substituted or unsubstituted aralkyl group, or a substituted or unsubstituted amino group, wherein a number median diameter (Dn50) of the inorganic particulate (B) is greater than or equal to about 1 nm and less than or equal to about 20 nm.

14 Claims, No Drawings

ORGANIC-INORGANIC HYBRID COMPOSITION, AND ARTICLE AND OPTICAL COMPONENT INCLUDING THE SAME

CROSS-REFERENCE TO RELATED APPLICATIONS

This application claims priorities to Japanese Patent Application No. 2018-157476 filed on Aug. 24, 2018, in the Japan Patent Office and Korean Patent Application No. 10-2019-0079637 filed in the Korean Intellectual Property Office on Jul. 2, 2019, and all the benefits accruing therefrom under 35 U.S.C. § 119, the entire contents of which are incorporated herein by reference.

BACKGROUND

1. Field

An organic-inorganic hybrid composition and an article and an optical component including the same are disclosed.

2. Description of the Related Art

Due to recent progress in the research of optical materials, there is a growing desire for the development of an optical material having a high refractive index and simultaneously improved heat resistance, light transparency, and reverse formability. Such optical materials can be used as an optical lens in an optical system for various electronics such as a camera, a video camera, and the like, or a smart phone, or the like. Compared with a glass lens, a resin (polymer) lens is light and not easily breakable, has a low material cost, and may be processed into various shapes through injection molding, which is appropriate for forming a lens. However, the development of a material having a high refractive index is needed due to a growing desire for thinner products or cameras having a higher pixel count.

In order to develop a polymer having a high refractive index as a resin material, an attempt to introduce an aromatic ring, a halogen atom, and a sulfur atom is being made. Specifically, a sulfur atom may be introduced to obtain an episulfide polymer compound, a thio urethane polymer, and the episulfide polymer compound. The thio urethane polymer has a refractive index of greater than or equal to about 1.7 but no plasticity and thus is limited in terms of its practical use. A triazine ring-containing polymer resin with a high refractive index and having a high plasticity has been investigated. For example, Japanese Patent Laid-Open Publication No. 2014-169464 discloses a high refractive index material including a triazine ring-containing polymer having a repeating unit structure having a triazine ring. The triazine ring-containing polymer alone is known to attain high heat resistance, high transparency, and a high refractive index.

An attempt to prepare an organic-inorganic hybrid composition by dispersing an inorganic material having a high refractive index in resin has been made. Strength may be increased in this way. For example, International Patent Publication No. WO 2013/094663 discloses that strength is improved in a film obtained by mixing a metal oxide particle with a triazine ring-containing polymer including a triazine ring-containing repeating unit.

SUMMARY

In order to transparently disperse an inorganic material such as an inorganic oxide particulate in a composition, deterioration of transmissive light needs to be suppressed by Rayleigh scattering, and particulates having a nanometer size in a primary particle state need to be uniformly dispersed in the resin. However, since the inorganic particulate may be more easily aggregated as its particle size is smaller, the inorganic particulate is very difficult to uniformly disperse. When the inorganic particulate is simply mixed with the resin, it may cause a phase-separation and make a composition opaque. It is also found that strength of the obtained article is insufficient.

Accordingly, the present disclosure is to provide an organic-inorganic hybrid composition having a high refractive index and high transparency and providing a high-strength article.

An organic-inorganic hybrid composition according to an embodiment includes a polymer having a triazine ring structure in a main chain of the polymer (A), an inorganic particulate (B), and a surface-treating agent having a triazine ring structure represented by Formula (1)(C):

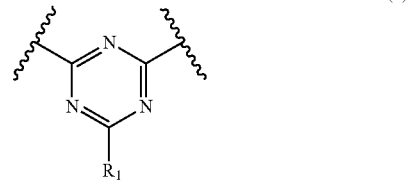

(1)

wherein, in the chemical formula, $R_1$ is a carboxyl group, a phosphoric acid group, a sulfo group, or a substituted or unsubstituted alkyl group, a substituted or unsubstituted alkenyl group, a substituted or unsubstituted alkynyl group, a substituted or unsubstituted aryl group, a substituted or unsubstituted aralkyl group, or a substituted or unsubstituted amino group, wherein a number median diameter (Dn50) of the inorganic particulate (B) is greater than or equal to about 1 nanometer (nm) and less than or equal to about 20 nm.

The surface-treating agent (C) may be represented by Formula (2):

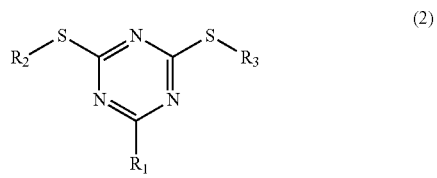

(2)

wherein, in the chemical formula, $R_1$ is a carboxyl group, a phosphoric acid group, a sulfo group, a substituted or unsubstituted alkyl group, a substituted or unsubstituted alkenyl group, a substituted or unsubstituted alkynyl group, a substituted or unsubstituted aryl group, a substituted or unsubstituted aralkyl group, or a substituted or unsubstituted amino group, and $R_2$ and $R_3$ are each independently a hydrogen atom, a substituted or unsubstituted alkyl group, or a substituted or unsubstituted aryl group.

The surface-treating agent (C) may be represented by Formula (3):

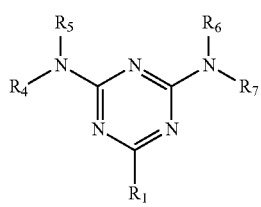

(3)

wherein, in the chemical formula, $R_1$ is a carboxyl group, a phosphoric acid group, a sulfo group, or a substituted or unsubstituted alkyl group, a substituted or unsubstituted alkenyl group, a substituted or unsubstituted alkynyl group, a substituted or unsubstituted aryl group, a substituted or unsubstituted aralkyl group, or a substituted or unsubstituted amino group, and R4, R5, R6, and R7 are each independently a hydrogen atom, a substituted or unsubstituted alkyl group, or a substituted or unsubstituted aryl group.

The surface-treating agent (C) may have a molecular weight of greater than or equal to about 100 and less than or equal to about 20000.

The surface-treating agent (C) may have a refractive index of greater than or equal to about 1.6 and less than or equal to about 2.0.

The polymer (A) may have a number average molecular weight of greater than or equal to about 20000.

The polymer (A) may be a thermoplastic polymer having a glass transition temperature (Tg).

The glass transition temperature of the polymer (A) may be greater than or equal to about 80 degree Celsius (° C.) and less than or equal to about 200° C.

The inorganic particulate (B) may have a refractive index of greater than or equal to about 1.8 and less than or equal to about 3.5.

The inorganic particulate (B) may include a zirconium oxide, a titanium oxide, a barium titanate, a strontium titanate, a zinc oxide, a gallium phosphide, a cerium oxide, a niobium oxide, or a combination thereof.

A sum content of the inorganic particulate (B) and the surface-treating agent (C) may be greater than or equal to about 5 weight % (wt %) and less than 80 wt % based on a sum content, 100 wt % of the polymer (A), the inorganic particulate (B) and the surface-treating agent (C).

A refractive index nD (587.6 nm) of the organic-inorganic hybrid composition may be greater than or equal to about 1.7.

According to another embodiment, an article and an optical component including the organic-inorganic hybrid composition is provided.

The organic-inorganic hybrid composition may have a high refractive index and high transparency and may provide an article having high strength.

DETAILED DESCRIPTION

Example embodiments of the present disclosure will hereinafter be described in detail, and may be easily performed by a person having an ordinary skill in the related art. However, this disclosure may be embodied in many different forms, and is not to be construed as limited to the example embodiments set forth herein.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

An embodiment provides an organic-inorganic hybrid composition including Component (A), Component (B), and Component C). As used herein, the "organic-inorganic hybrid composition including Component (A), Component (B), and Component (C)" is simply referred to as "a composition according to the present disclosure."

(1) Component (A): a polymer having a triazine ring structure in a main chain of the polymer;

(2) Component (B): an inorganic particulate; and (3) Component (C): a surface-treating agent having a triazine ring structure represented by Formula (1):

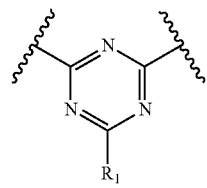

(1)

wherein, in Formula (1), $R_1$ is a carboxyl group, a phosphoric acid group, a sulfo group (—$SO_3H$), or a substituted or unsubstituted alkyl group, a substituted or unsubstituted alkenyl group, a substituted or unsubstituted alkynyl group, a substituted or unsubstituted aryl group, a substituted or unsubstituted aralkyl group, or a substituted or unsubstituted amino group.

Herein, a number median diameter (Dn50) of the inorganic particulate (B) is greater than or equal to about 1 nm and less than or equal to about 20 nm.

The organic-inorganic hybrid composition according to an embodiment has a high refractive index. Even though a technical scope of the present disclosure is not limited, such an effect may be obtained through the following mechanism.

The composition according to the present disclosure includes a polymer having a triazine ring structure in the polymer main chain structure, i.e., in a main chain of the polymer (hereinafter, referred to as a triazine ring-containing polymer) as Component (A). The triazine ring-containing polymer is thermoplastic but has improved heat resistance compared with a thermoplastic resin such as a vinyl polymer and a high refractive index of greater than or equal to about 1.7. In addition, the triazine ring-containing polymer has a triazine ring structure in the main chain structure and thus becomes thermoplastic and has a refractive index of greater than or equal to about 1.7 like the episulfide polymer compound and the thio urethane polymer obtained by introducing a sulfur atom but may be easily processed through injection molding and the like compared with a material having no plasticity.

In a polymer monomer, as the refractive index increases, the glass transition temperature increases. However, a composition according to the present disclosure further includes an inorganic particulate as Component (B) in addition to the triazine ring-containing polymer having a high refractive index and thus has a higher refractive index and may be more appropriate for injection molding and improve strength of an article.

In order to transparently disperse the inorganic particulate, degradation of transmissive light due to Rayleigh scattering may be suppressed, and in order to maintain colorless transparency within a visible light range, the inorganic particulate need to maintain a particle size of greater than or equal to about 1 nm and less than or equal to about 20 nm and be uniformly dispersed in a primary particle state in a resin. However, as the particle size is smaller, the particulate may be more easily aggregated and thus are more difficult to uniformly disperse. WO2003/094663 discloses treatment of a metal oxide particle with an organic silicon compound such as a silane coupling agent. However, a review of the inventors has shown that even with this method, sufficient dispersion may not be obtained, and high refractive index, transparency, and strength required for application to optical materials may not also be obtained.

In one or more embodiments, the surface of the inorganic particulate such as an inorganic oxide nanoparticle and the like is modified by using a surface-treating agent having a predetermined triazine ring. Accordingly, a hydroxy group and the like on the surface of the inorganic particulate, which is mostly prepared as dispersion of water or polar solvent, are coated with the surface-treating agent, this may improve the dispersibility of the inorganic particulate in the polymer (A) that is an organic resin. In addition, since the surface of the inorganic particulate is coated with a compound having a triazine ring, the affinity for the polymer (A) having the same triazine ring structure is increased. As a result, the inorganic particulate is uniformly dispersed in the polymer (A), and the polymer (A) and the inorganic particulate (B) may rarely be phase-separated from each other. As a result, a high transparency and simultaneously, a high refractive index according to a refractive index of the polymer and the inorganic particulate may be obtained. In addition, the strength of the article may be improved by the interaction of the polymer (A) and the surface-treating agent (C).

Hereinafter, an example embodiment is described. However, the present disclosure is not limited to the following embodiments.

As used herein, when particular description is not otherwise provided, operations and measurement of properties are performed under the conditions of room temperature (about 20° C. to about 25° C.)/relative humidity of 40% RH to 50% RH.

Component (A)

Component (A) is a polymer having a triazine ring structure in a polymer main chain structure, i.e., a triazine ring in a main chain of the polymer. Component (A) is not particularly limited as long as it has a triazine ring structure in a polymer main chain structure, and conventionally known ones may be used. For example, polymers disclosed in Japanese Patent Laid-Open Publication No. 2014-162829, Japanese Patent Laid-Open Publication No. 2014-162830, and Japanese Patent Laid-Open Publication No. 2015-227392 may be used.

In the organic-inorganic hybrid composition of an embodiment, Component (A) is a polymer having a triazine ring structure represented by Formula (1) in a polymer main chain structure:

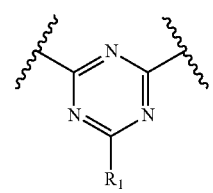

(1)

In Formula (1), $R_1$ is each independently a substituted or unsubstituted alkyl group, a substituted or unsubstituted aryl group, a substituted or unsubstituted aralkyl group, a substituted or unsubstituted amino group, a substituted or unsubstituted aryl amino group, a substituted or unsubstituted alkylthio group, or a substituted or unsubstituted arylthio group.

In an embodiment, $R_1$ may each independently be a C1 to C10 alkyl group, a C6 to C14 aryl group, a C7 to C20 aralkyl group, an amino group (—$NH_2$), a C6 to C14 aryl amino group, a C1 to C10 alkyl thio group, or a C6 to C14 arylthio group, where each group may be unsubstituted or may have a substituent. Such a substituent may be a halogen atom (for example, a fluorine atom, a chlorine atom, a bromine atom, or an iodine atom), a hydroxy group, an amino group, a C1 to C3 alkyl group (for example, a methyl group, an ethyl group, a n-propyl group, or an isopropyl group), a carboxyl group, a sulfo group (—$SO_3H$), a sulfino group (—$SO_2H$), a sulfinyl group (—S(=O)R), a phosphonic acid group (—$PO(OH)_2$), a phosphoryl group (—OP(=O))$OH)_2$), a phosphinyl group (—$P(OR_3)$), a phosphono group (—PO$(OR)_2$), a thiol group, and a sulfonyl group (—$S(=O)_2R$) wherein each R is independently a C1-C10 alkyl or a C6-C14 aryl group. It is to be understood that any given substituent of any group ($R_1$, $R_2$, or $R_3$) is not the same as the substituted group. For example, an alkyl group is not substituted with an alkyl group, but an aryl group may be substituted with an alkyl group. In addition, the number of carbon atoms in any group is inclusive of the number of carbon atoms in the group and in the substituent. For example, a tolyl group is a C7 aryl group.

The alkyl group may be a linear or branched alkyl group, and specifically a methyl group, an ethyl group, a n-propyl group, an isopropyl group, a n-butyl group, an isobutyl group, a sec-butyl group, a tert-butyl group, a n-pentyl group, a n-hexyl group, a n-heptyl group, a n-octyl group, a n-decyl group, and the like. In some embodiments, a C1 to C6 alkyl group or a C1 to C4 alkyl group may be desirable.

The aryl group may be a C6 to C14 aryl group, for example a phenyl group, a naphthyl group, an anthracenyl group, a biphenyl group, an indenyl group, and the like. In some embodiments, a C6 to C12 aryl group may be desirable.

The aralkyl group may be a C7 to C20 aralkyl group, for example a C6 to C14 aryl-C1 to C6 alkyl group, or a C6 to C12 aryl-C1 to C6 alkyl group. The C6 to C14 aryl group may be the above-mentioned aryl group. Specific examples of the C6 to C14 aryl-C1 to C6 alkyl group may be a benzyl group, a phenethyl group, a phenyl propyl group, a naphthyl methyl group, a naphthyl ethyl group, and the like.

The aryl amino group (aromatic amino group) may be an anilino group, a p-carboxyl anilino group, a diphenyl amino group, a ditolylamino group, and the like.

The alkylthio group (alkylthiol group) may be a methylthio group, an ethylthio group, propylthio group, butylthio group, and the like.

The arylthio group (aromatic thiol group) may be a phenylthio group, a naphthylthio group, and the like.

In some embodiments, $R_1$ may include an acidic functional group. That is, $R_1$ may be an alkyl group, an aryl group, aralkyl group, an amino group, an aryl amino group, an alkylthio group, or an arylthio group. Thereby, binding properties with a surface of an inorganic particulate are improved and dispersibility of an inorganic particulate in a resin may be improved. In some embodiments, $R_1$ may include a carboxyl group. The inorganic particulate may be more uniformly dispersed in the triazine ring-containing polymer without phase-separation by including a carboxyl group in a portion of $R_1$.

In some embodiments, Component (A) is a polymer including the triazine ring structure represented by Formula (2). In the polymer represented by Formula (2), a bond between the triazine ring and $R_2$ is a thio ether group.

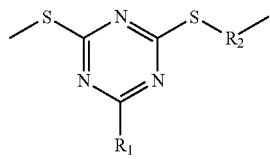

(2)

In Formula (2), $R_1$ is each independently a substituted or unsubstituted alkyl group, a substituted or unsubstituted aryl group, a substituted or unsubstituted aralkyl group, a substituted or unsubstituted amino group, a substituted or unsubstituted aryl amino group, a substituted or unsubstituted alkylthio group, or a substituted or unsubstituted arylthio group, and $R_2$ is each independently a divalent group (divalent aromatic group) having an aromatic ring.

In Formula (2), the substituent of $R_1$ may be for example the substituent exemplified as a substituent of $R_1$ in Formula (1) of the above-mentioned Component (A).

As shown in Formula (2), the polymer has a thio ether structure by binding a triazine ring with $R_2$ and thus may have a higher refractive index and a glass transition temperature in a range of greater than or equal to about 80° C. and less than or equal to about 200° C. When the glass transition temperature is controlled within the range, injection molding properties may be improved. In addition, $R_2$ may be an aromatic group. As used herein an aromatic group may be monovalent or divalent as dictated by the structure of the compound, and may be wholly aromatic (for example phenylene), or a combination of aliphatic and aromatic. A divalent group having an aromatic ring may be used as $R_2$ to promote a molecular interaction and thus obtain a high refractive index.

The divalent group having the aromatic ring may be for example a C6 to C30 aromatic group and $R_2$ may be an aromatic group such as a phenylene group, a naphthylene group, a biphenylene group, a divalent group derived from diphenylether or diphenylsulfide, a divalent group derived from bisphenol, and the like. An alkylene group may be bound to these aromatic groups. These groups may have a substituent. Such a substituent may be a halogen atom (for example, a fluorine atom, a chlorine atom, a bromine atom, or an iodine atom), a hydroxy group, an amino group, a C1 to C3 alkyl group (for example, a methyl group, an ethyl group, a n-propyl group, or an isopropyl group), a carboxyl group, a sulfo group [—$SO_3H$], a sulfino group, a sulfinyl group, a phosphonic acid group [—$PO(OH)_2$], a phosphoryl group, a phosphinyl group, a phosphono group, a thiol group, a phosphonyl group, and a sulfonyl group.

In some embodiments, $R_2$ includes at least one represented by the following formulae.

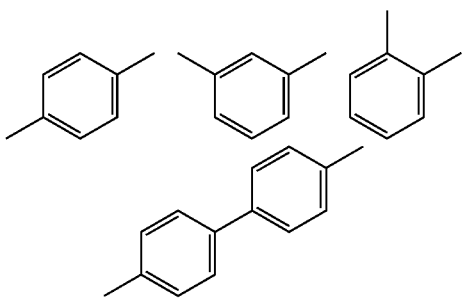

-continued

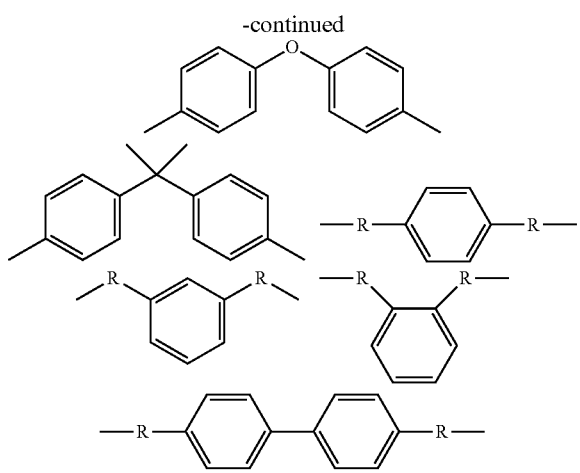

In the formulae, R is each independently a substituted or unsubstituted alkylene group. The alkylene group may be a C1 to C10 alkylene group and the alkylene group may be for example a methylene group, an ethylene group, a trimethylene group, a propylene group, a tetramethylene group, a 1,2-dimethyl ethylene group, and the like. These groups may have a substituent and the substituent may be the same as the substituent of $R_2$ in Formula (2) of the above-mentioned Component (A).

When $R_2$ is the above groups in the triazine ring-containing polymer, higher refractive index may be obtained. In addition, while maintaining a high refractive index, a solubility for an organic solvent is improved and a glass transition temperature may be controlled within a range of greater than or equal to about 80° C. and less than or equal to about 200° C.

In some embodiments, the organic-inorganic hybrid composition includes a triazine ring-containing polymer including one of the following repeating units in a portion of the polymer.

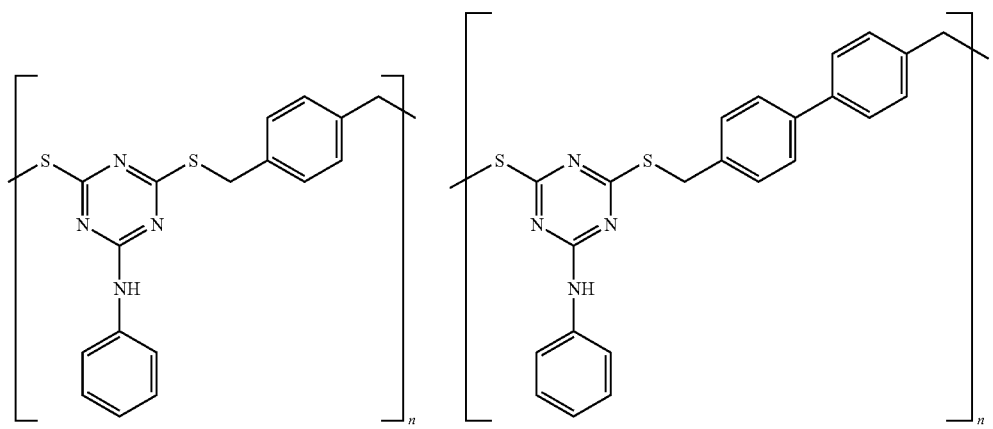

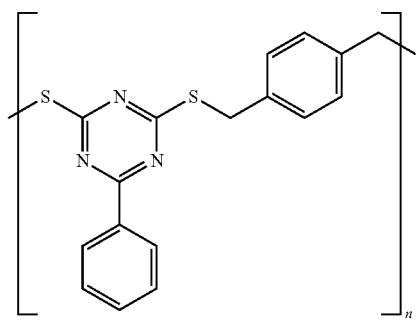

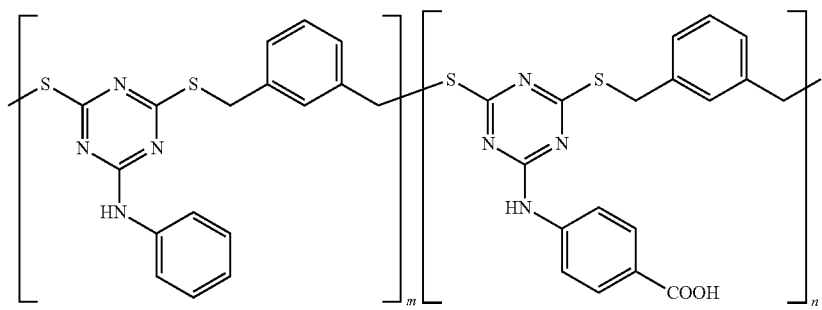

-continued

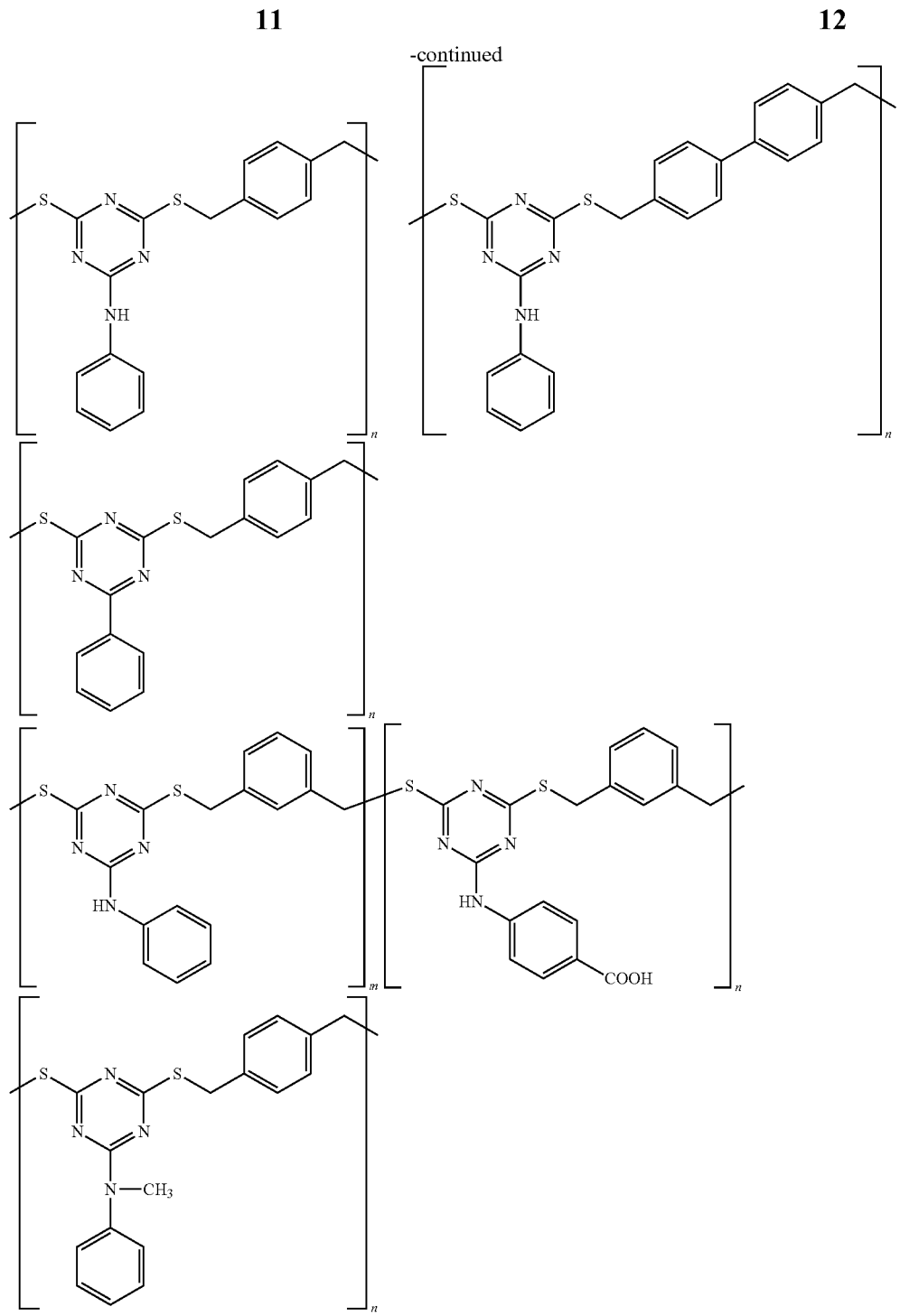

A number average molecular weight (Mn) of Component (A) may be for example greater than or equal to about 20000, greater than or equal to about 20000 and less than or equal to about 100000, or greater than or equal to about 20000 and less than or equal to about 70000. Within the numeral ranges, transmittance (transparency) or heat resistance of the composition is particularly improved, the composition is appropriate for a process (a molding process using a mold such as injection molding or compression) of obtaining an article from the composition, and a mechanical strength of the obtained article is improved. As used herein, a number average molecular weight (Mn) of Component (A) is a value measured by a gel permeation chromatography (GPC) described in examples, and is in units of grams per mole.

A refractive index nD of Component (A) may be greater than or equal to about 1.65, for example greater than or equal to about 1.7. Within the range, an organic-inorganic hybrid composition having an improved refractive index may be obtained. The organic-inorganic hybrid composition may have much higher refractive index due to the triazine ring-containing polymer, for example, a structure having a sulfur atom linked with a triazine ring as shown in Formula (2). A high refractive index resin having a nitrogen atom linked with a triazine ring has been reported (for example, Japanese Patent Laid-Open Publication No. 2014-162830) but may not be applied to a process of obtaining an article at a glass transition temperature of greater than about 200° C. (a molding process using a mold such as injection molding, compression molding, or the like). In addition, a divalent group having an aromatic ring as $R_2$ may be introduced to much promote a molecular interaction to obtain an improved refractive index.

Component (A) may be a thermoplastic resin having a glass transition temperature (Tg). In other words, Component (A) exhibits an inflection point in a differential thermal curve that is measured by increasing a temperature up to 300° C. at a temperature increase rate of 10° C./min, maintaining samples for 10 minutes, cooling the samples to 25° C. at a temperature decrease rate of 10° C./min, maintaining the samples for 10 minutes, and increasing the temperature up to 300° C. at a temperature increase rate of 10° C./min using a differential scanning calorimeter (DSC). The resin having a glass transition temperature has thermoplasticity and may be subject to injection molding. A glass transition temperature (Tg) of Component (A) may be for example greater than or equal to about 80° C. and less than or equal to about 250° C., and considering handling during an injection molding and heat resistance of the composition, the Tg of Component (A) may be greater than or equal to about 80° C. and less than or equal to about 200° C. The Tg of Component (A) may be adjusted by controlling a structure of $R_1$ and $R_2$ of Formula (2) and the like, for example, the Tg may be increased by increasing a ratio of introducing a structure having a large volume or a rigid structure into an $R_1$ portion of a triazine dithiol compound used as a raw material for a synthesis. Also, the glass transition temperature (Tg) of Component (A) is a value measured using a differential scanning calorimeter (DSC) as described in the examples.

Each repeating unit of Component (A) may have any type of repeat pattern, for example, a block type or a random type.

Component (A) is not particularly limited and may be prepared by a known method. For example, a triazine ring-containing polymer having a structure represented by Formula (2) as a repeating unit may be prepared by reacting a triazine dithiol compound with a dihalogenated aromatic compound in the presence of a phase-transfer catalyst as shown in Scheme 1.

Scheme 1

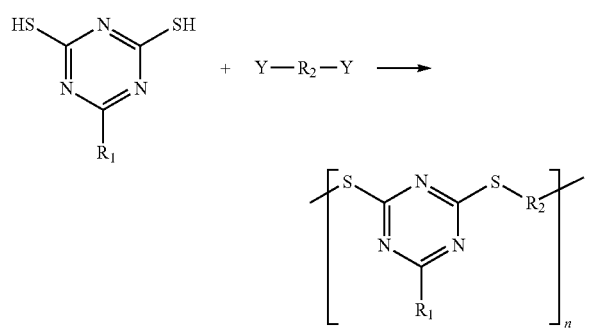

In the Scheme 1, Y is a halogen atom, and $R_1$ is a substituted or unsubstituted alkyl group, a substituted or unsubstituted aryl group, a substituted or unsubstituted aralkyl group, a substituted or unsubstituted amino group, a substituted or unsubstituted aryl amino group, a substituted or unsubstituted alkylthio group, or a substituted or unsubstituted arylthio group, and $R_2$ is a divalent group having an aromatic ring.

In one or more embodiments, the halogen atom of Y may be a fluorine atom, a chlorine atom, a bromine atom, or an iodine atom.

The triazine dithiol compound is not particularly limited but may be for example 2-anilino-1,3,5-triazine-4,6-dithiol, 2-(p-carboxyl)anilino-1,3,5-triazine-4,6-dithiol, 2-phenyl-1,3,5-triazine-4,6-dithiol, and the like. The dihalogenated aromatic compound may be for example α,α'-dibromo-p-xylene, α,α'-dibromo-o-xylene, α,α'-dibromo-m-xylene, 4,4'-bis(bromomethyl)biphenyl, and the like. These may be used alone or in a combination of two or more.

The phase-transfer catalyst used for a reaction of the triazine dithiol compound and the dihalogenated aromatic compound may be a long-chain alkyl quaternary ammonium salt and crown ether which may be used for interfacial polymerization, for example, hexadecyltrimethyl ammonium bromide.

The reaction system may include a two-phase system of water and an organic solvent, for example, a two-phase system of an organic solvent such as chloroform, dichloro methane, benzonitrile, nitrobenzene, and the like and water. Once the reaction starts, a base such as sodium hydroxide, potassium hydroxide, and the like may be added and reaction may be performed at about −10° C. to about 100° C. for about 2 hours to about 120 hours.

The obtained triazine ring-containing polymer may be purified by a general purifying method of a reprecipitation method, a dialysis method, an ultrafiltration method, an extraction method, and the like.

Component (B)

Component (B), the inorganic particulate may be a metal oxide, a metal sulfide, a metal phosphide, a metal selenide, a metal telluride, and the like. In the organic-inorganic hybrid composition of an embodiment, the inorganic particulate (B) has at least a portion of its surface covered by a surface-treating agent (C).

The metal oxide is not particularly limited but may be for example a zirconium oxide, a yttrium oxide-addition zirconium oxide, a lead zirconate, a strontium titanate, a tin titanate, tin oxide, a bismuth oxide, a niobium oxide, a tantalum oxide, a potassium tantalate, a tungsten oxide, a cerium oxide, a lanthanum oxide, a gallium oxide, silica, a titanium oxide, a barium titanate, and the like.

In some embodiments, when the organic-inorganic hybrid composition is used for an optical use, an inorganic particulate having a high refractive index is desirable and an inorganic particulate having a refractive index of greater than or equal to about 1.8 may be desirably used. The upper limit of the refractive index is not particularly limited, but is substantially less than or equal to about 3.5.

Specifically, in some embodiments, the inorganic particulate may be, a zirconium oxide (refractive index=about 2.1), a titanium oxide, a barium titanate (refractive index=about 2.4), a strontium titanate, a zinc oxide, a gallium phosphide, a cerium oxide, or a niobium oxide. In some embodiments, the inorganic particulate may include a zirconium oxide particle, a titanium oxide particle, a titanium oxide particle, a strontium titanate particle, a zinc oxide particle, a gallium phosphide particle, a cerium oxide particle, or a niobium oxide particle. In some embodiments, the inorganic particulate may be more desirably a zirconium oxide particle, a titanium oxide particle, or a barium titanate particle. In some embodiments, even though the titanium oxide mainly has two kinds of crystal structures of a rutile-type (a refractive index=about 2.7) and an anatase-type (a refractive index=about 2.5), the rutile-type titanium oxide may be desirable since the anatase-type titanium oxide has a high photocatalyst activity and is not desirable for an optical use. In addition, in order to reduce the photocatalyst activity of the titanium oxide, a titanium oxide particle coated with silica on the surface may be used.

The inorganic particulate may include a single type of particle or may include a combination of two or more different types of particles.

The number median diameter Dn50 of the inorganic particulate is greater than or equal to about 1 nm and less than or equal to about 20 nm. When the number median diameter of the inorganic particulate is greater than about 20 nm, transparency of the obtained composition may be decreased. In an embodiment, the number median diameter of the inorganic particulate is less than about 1 nm, secondary aggregation of the inorganic particulate may easily be generated. In some embodiments, the number median diameter of the inorganic particulate may be less than or equal to about 15 nm or less than or equal to about 10 nm. In an embodiment, the number median diameter Dn50 of the inorganic particulate is a number median diameter according to a dynamic light scattering method.

The inorganic particulate may be prepared using known methods disclosed in Japanese Patent Laid-Open Publication No. 2011-213505, Japanese Patent Laid-Open Publication No. 2012-180241.

The inorganic particulate may be commercial products which may be in a form of a solvent dispersion. These commercial products may be SZR-W, SZR-CW, SZR-M, SZR-CM (zirconium oxide dispersion, Sakai Chemical Industry Co., Ltd.); Thai Nok (registered trademark) RA-6, NRA-10M (titanium oxide dispersion, Taki Chemical Co., Ltd.), and the like.

Component (C)

The Component (C), the surface-treating agent (a surface-modifying agent) may be used for modifying a surface of the inorganic particulate.

The Component (C) is a surface-treating agent having a triazine ring structure represented by Formula (1):

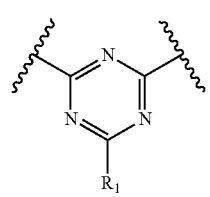

(1)

wherein, in Formula (1), $R_1$ is a carboxyl group, a phosphoric acid group, a sulfo group, or a substituted or unsubstituted alkyl group, a substituted or unsubstituted alkenyl group, a substituted or unsubstituted alkynyl group, a substituted or unsubstituted aryl group, a substituted or unsubstituted aralkyl group, or a substituted or unsubstituted amino group.

In some embodiments, $R_1$ may be a carboxyl group, a phosphoric acid group, a sulfo group, a substituted or unsubstituted C1 to C10 alkyl group, a substituted or unsubstituted C2 to C10 alkenyl group, a substituted or unsubstituted C2 to C10 alkynyl group, a substituted or unsubstituted C6 to C14 aryl group, a substituted or unsubstituted C7 to C20 aralkyl group, or a substituted or unsubstituted amino group.

When $R_1$ is an alkyl group having a substituent, an alkenyl group having a substituent, an alkynyl group having a substituent, an aryl group having a substituent, an aralkyl group having a substituent, or an amino group having a substituent, such a substituent may be a halogen atom (for example, a fluorine atom, a chlorine atom, a bromine atom, or an iodine atom), a hydroxy group, an amino group, a C1 to C6 alkyl group (for example, methyl group, ethyl group, n-propyl group, isopropyl group, or n-butyl group), a C2 to C6 alkenyl group, a C2 to C6 alkynyl group, a carboxyl group, a sulfo group (—$SO_3H$), a sulfino group, a sulfinyl group, a phosphonic acid group (—$PO(OH)_2$), a phosphoryl group, a phosphinyl group, a phosphono group, a thiol group, a phosphonyl group, and sulfonyl group. As described above, the given substituent is not the same as the substituted group. For example, an alkyl group is not substituted with an alkyl group.

When $R_1$ is an amino group, at least one hydrogen atom of an amino group may be desirably replaced, and two hydrogen atoms of an amino group may be more desirably replaced. More desirably, a hydrogen atom of an amino group may be replaced by a substituent of a C1 to C6 alkyl group, a C2 to C6 alkenyl group, or a C2 to C6 alkynyl group.

The surface-treating agent of Component (C) may include an acidic functional group. The acidic functional group of the surface-treating agent may be, for example, a functional group such as a carboxyl group, a sulfo group (—$SO_3H$], a sulfino group, a phosphonic acid group (—$PO(OH)_2$), a phosphinic acid group, a phosphoric acid group, and the like; and a salt thereof. In one or more embodiments, the acidic functional group is desirably a carboxyl group, a phosphinic acid group, or a sulfo group, and particularly may be a carboxyl group. When a surface-treating agent having a carboxyl group is used, mold corrosion is not formed or minimally formed in injection molding and mold releasing properties are improved.

The Component (C) may be a compound represented by Formula (2).

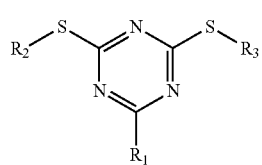

(2)

In Formula (2), $R_1$ is a carboxyl group, a phosphoric acid group, a sulfo group, or a substituted or unsubstituted alkyl group, a substituted or unsubstituted alkenyl group, a substituted or unsubstituted alkynyl group, a substituted or unsubstituted aryl group, a substituted or unsubstituted aralkyl group, or a substituted or unsubstituted amino group, and $R_2$ and $R_3$ are each independently a hydrogen atom, a substituted or unsubstituted alkyl group or a substituted or unsubstituted aryl group.

In Formula (2), the substituent of $R_1$ may be for example the same as the substituents exemplified $R_1$ in Formula (1) of the above-mentioned Component (C). In an embodiment, the substituent of $R_1$ in Formula (2) may be a substituted or unsubstituted C1 to C10 alkyl group. In another embodiment, the substituent may be an unsubstituted C1 to C10 alkyl group.

The alkyl group and aryl group as $R_2$ and $R_3$ may be substituted. The substituent may be the same as a substituent of $R_1$ in Formula (1) of the above-mentioned Component (C).

As in Formula (2), the structure including a sulfur atom as a bond the triazine ring and $R_2$ and $R_3$ may have a high refractive index.

From the viewpoint of interaction with particles, $R_2$ and $R_3$ are desirably at least one hydrogen atom. In an embodiment $R_2$ and $R_3$ are both hydrogen 15 atoms.

In an embodiment, a desirable surface-treating agent represented by Formula (2) may be specifically 2-anilino-1,3,5-triazine-4,6-dithiol, 6-(dimethylamino)-1,3,5-triazine-2,4-dithiol, 6-(diethylamino)-1,3,5-triazine-2,4-dithiol, 6-(dibutylamino)-1,3,5-triazine-2,4-dithiol, 6-(methylphenylamino)-1,3,5-triazine-2,4-dithiol, 6-phenyl-1,3,5-triazine-2,4-dithiol, and the like.

In another embodiment, Component (C) is a compound represented by Formula (3).

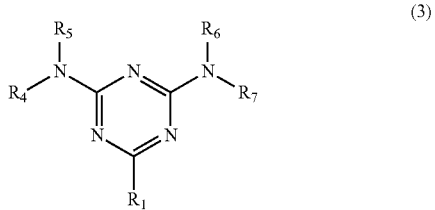

(3)

In Formula (3), $R_1$ is a carboxyl group, a phosphoric acid group, a sulfo group, or a substituted or unsubstituted alkyl group, a substituted or unsubstituted alkenyl group, a substituted or unsubstituted alkynyl group, a substituted or unsubstituted aryl group, a substituted or unsubstituted aralkyl group, or a substituted or unsubstituted amino group, and $R_4$, $R_5$, $R_6$, and $R_7$ are each independently a hydrogen atom, a substituted or unsubstituted alkyl group, or a substituted or unsubstituted aryl group.

In Formula (3), the substituent of $R_1$ may be for example the same as a substituent of $R_1$ in Formula (1) of the above-mentioned Component (C).

The alkyl group and the aryl group as $R_4$, $R_5$, $R_6$, and $R_7$ may be unsubstituted. The alkyl group and aryl group as $R_4$, $R_5$, $R_6$, and $R_7$ may be substituted. The substituent may be for example the same as a substituent exemplified as a substituent of $R_1$ in Formula (1) of the above-mentioned Component (C). In an embodiment, the substituent of $R_4$, $R_5$, $R_6$, and $R_7$ in Formula (3) may be a substituted or unsubstituted C1 to C10 alkyl group. In another embodiment, the substituent may be an unsubstituted C1 to C10 alkyl group.

As in Formula (3), the structure including a nitrogen atom as a bond the triazine ring with $R_4$, $R_5$, $R_6$, and $R_7$ may have a high refractive index.

In an embodiment, a desirable surface-treating agent represented by Formula (3) may be specifically 2,4-diamino-6-phenyl-1,3,5-triazine(benzoguanamine), 2,4-diamino-6-methyl-1,3,5-triazine(acetoguanamine), 2,4-diamino-6-nonyl-1,3,5-triazine, toluguanamine, xyloguanamine, phenyl benzoguanamine, naphthoguanamine, and the like.

Among them, from the viewpoint of improved balance among transparency, refractive index, and transmittance and improved molding formability, the surface-treating agent may be at least one of, 6-(dibutyl amino)-1,3,5-triazine-2, 4-dithiol or benzoguanamine.

The surface-treating agent may be used alone as a single type or in combination of two or more types.

A molecular weight of the surface-treating agent (C) is preferably from 100 to less than 20000, more preferably from 100 to less than 10000, more preferably from 100 to less than 5000. A molecular weight of the surface-treating agent (C) is not particularly limited but may be desirably greater than or equal to about 100 and less than about 20000, more desirably greater than or equal to about 100 and less than or equal to about 10000, and even more desirably greater than or equal to about 100 and less than or equal to about 5000. Within the ranges, the inorganic oxide particulate may be more uniformly dispersed in the polymer having a triazine ring structure in a polymer main chain structure (A) without phase separation. As a result, the advantageous effects of the present composition may be greatly obtained. When two or more types of surface-treating agents are used, it is desirable that the molecular weight of the at least one surface-treating agent is within these ranges, and it is more desirable that the molecular weights of all surface-treating agents are within these ranges.

The refractive index of the surface-treating agent (C) may be greater than or equal to about 1.6 and less than or equal to about 2.0, more desirably greater than or equal to about 1.7 and less than or equal to about 2.0. By using such a surface-treating agent, an organic-inorganic hybrid composition having a high refractive index may be obtained. In an embodiment, the refractive index of the surface-treating agent may be increased by introducing a structure having a sulfur atom linked with the triazine ring, or a nitrogen atom linked with the triazine ring. When two or more types of surface-treating agents are used, it is desirable that the refractive index of at least one surface-treating agent is within the ranges, and it is more desirable that the refractive indexes of all surface-treating agents are within the ranges.

A method of surface-modifying the inorganic particulate with a surface-treating agent is not particularly limited and may be for example a wet method or a dry method. From the viewpoint of modifying the inorganic particulate more efficiently and inhibiting secondary aggregation of the inorganic particulate, a wet method may be desirable. When the inorganic particulate is modified with a wet method, for example, the organic surface-modifying agent is added to dispersion of the inorganic particulate and then stirred and thereby the surface of the inorganic particulate may be modified. A mixture of the surface-treating agent and the inorganic particulate prepared by such a method may be mixed with Component (A).

A solvent used in the dispersion of the inorganic particulate is not particularly limited but from the viewpoint of dispersing the inorganic particulate uniformly, water; alcohols such as methanol, ethanol, propanol, isopropanol, and the like; and a mixture thereof may be desirable. In addition, in order to stabilize the dispersion, for example, other components acid such as formic acid, acetic acid, hydrochloric acid, nitric acid, and the like or alkali and the like may be added to the dispersion. These components may be removed through washing or drying before mixing it with the Component (A).

An additional amount of the surface-modifying agent may be determined so as to obtain an appropriate surface-modification, but a ratio of the surface-treating agent:inorganic particulate may be as follows: about 1 part by weight to about 100 parts by weight, for example about 5 parts by weight to about 20 parts of the inorganic particulate relative to 1 part by weight of the surface-treating agent. When two or more surface-treating agents are used, it is preferable that the sum content is within the range.

A reaction time to modify the inorganic particulate with the surface-treating agent is not particularly limited, but may be generally greater than or equal to about 15 minutes and less than or equal to about 12 hours, or generally greater than or equal to about 30 minutes and less than or equal to about 5 hours. In addition, a reaction temperature is not particularly limited, but may be greater than or equal to about 10° C. and less than or equal to about 100° C., for example greater than or equal to about 10° C. and less than or equal to about 60° C., for another example greater than or equal to about 10° C. and less than or equal to about 40° C.

After the reaction, the obtained dispersion may be concentrated. In addition, an excessive modifying agent or other components may be removed by washing or filtering.

Method of Preparing Composition

The composition according to the present disclosure may be obtained by mixing Component (A), Component (B), and Component (C) simultaneously, but from the viewpoint of an effective modification of the inorganic particulate with the surface-modifying agent, as described above, a mixture of the Component (B) and Component (C) is prepared and then the mixture and the Component (A) are mixed. During preparation of the composition, a solvent such as chloroform, dichloro methane, diethylether, tetrahydrofuran, ethyl acetate, acetone, acetonitrile, N,N-dimethyl formamide (DMF), N-methyl-2-pyrrolidone (NMP), and the like may be used.

A content of each component in the composition is not particularly limited but a sum of the inorganic particulate (B) and the surface-treating agent (C) may be greater than or equal to about 1 wt % and less than or equal to about 99 wt % based on 100 wt % of a sum of the polymer (A), the inorganic particulate (B), and the surface-treating agent (C). From the viewpoint of an improved refractive index of an article obtained from the composition, a sum of the inorganic particulate (B) and the surface-treating agent (C) may be greater than or equal to about 5 wt % and less than about 80 wt % or greater than or equal to about 5 wt % and less than or equal to about 70 wt % based on 100 wt % of a sum of the polymer (A), the inorganic particulate (B), and the surface-treating agent (C). From the viewpoint of an improved transmittance and mechanical strength of the composition, a sum of the inorganic particulate (B) and the surface-treating agent (C) may be greater than or equal to about 10 wt % and less than or equal to about 50 wt %.

In an embodiment, a content of the polymer (A) may be greater than or equal to about 1 wt % and less than or equal to about 99 wt % based on a total content of the composition. In another embodiment, a content of the polymer (A) may be greater than about 20 wt % and less than or equal to about 95 wt % based on a total content of the composition.

In an embodiment, a sum content of the inorganic particulate (B) and the surface-treating agent (C) may be greater than or equal to about 1 wt % and less than or equal to about 99 wt % based on a total content of the composition. In another embodiment, the sum content of the inorganic particulate (B) and the surface-treating agent (C) may be greater than about 5 wt % and less than about 80 wt % based on a total content of the composition.

The composition according to the present disclosure may include optionally an additive such as an antioxidant, an ultraviolet (UV) absorber, a stabilizer, a heat stabilizer, a plasticizer, a colorant, a blowing agent, a flame retardant, a flame-retardant aid, a release agent, a plasticizer, an impact resistance improving agent, a reinforcing agent, a dispersing agent, an antistatic agent, a foaming agent, an antibacterial agent, other resins, an elastomer, and the like.

The organic-inorganic hybrid composition according to the present disclosure has a refractive index nD of greater than or equal to about 1.70, for example greater than or equal to about 1.75. The refractive index of the organic-inorganic hybrid composition may be adjusted by selecting refractive indexes of the triazine ring-containing polymer, inorganic particulate, and surface-treating agent. It may also be adjusted by adjusting the sum content of inorganic particulate and surface-treating agent to the sum content of the triazine ring-containing polymer, inorganic particulate, and surface-treating agent. The refractive index of the organic-inorganic hybrid composition is a value measured by the method described in examples.

A total light transmittance of the organic-inorganic hybrid composition of the present disclosure is desirably greater than or equal to about 80%. In addition, a haze of the organic-inorganic hybrid composition of the present disclosure is desirably less than or equal to about 3.0%. The total light transmittance and haze of the organic-inorganic hybrid composition may be adjusted by selecting refractive indexes and mixing ratios of the triazine ring-containing polymer, inorganic particulate, and surface-treating agent. The total light transmittance and haze of the organic-inorganic hybrid composition are values measured by the method described in examples.

Article and Optical Component

An embodiment provides an article including the organic-inorganic hybrid composition. Another embodiment relates to an optical component including the organic-inorganic hybrid composition. A shape of the article is not particularly limited but any type, for example, lens-type (spherical lens, non-spherical lens, Fresnel lens, and the like), film-type, sheet-type, plate-type, bar-type, fiber-type, prism-type, and the like. The article may be manufactured, for example, using a method such as an injection molding method, a compression molding method, an extrusion method, a transfer method, a blow method, a pressure method, a coating method (a spin coating method, a roll coating method, a curtain coating method, a dip coating method, a casting method, and the like) and the like, but the composition of the present embodiment is particularly appropriate for the injection molding. Before forming the article, a kneading apparatus such as a Henschel mixer, a kneader, a Banbury mixer, an extruder, and the like may be used to mix raw materials. When the injection molding is adopted, a cylinder temperature may be, for example, greater than or equal to about 150° C. and less than or equal to about 300° C. and a molding temperature of greater than or equal to about 50° C. and less than or equal to about 100° C.

The optical component may be appropriately used as an optical component transmitting light (a passive optical component) in a display (for example, a display for a smart phone, a liquid crystal display, a plasma display, and the like), an imaging system (for example, a camera, a video, and the like), an optical pickup, a projector, an optical fiber communication equipment (for example, an optical amplifier and the like), a head lamp for a vehicle, and the like.

These optical components may include, for example, lens, a film, an optical waveguide, a prism, a prism sheet, a panel, an optical disk, a sealant of LED, and the like. These optical components may include, if required, various functional layers such as an anti-reflection layer, a light absorption layer, a hard coating layer, an antiglare layer, and the like.

EXAMPLES

Hereinafter, the present disclosure is illustrated in detail by using Examples but is not limited thereto. As used herein, "part" indicates "part by weight" unless it is particularly specified.

Evaluation Methods

Number Average Molecular Weight (Mn) and Weight Average Molecular Weight (Mw))

A measurement sample is prepared by dissolving a polymer in tetrahydrofuran (THF) to have a concentration of 0.1 wt % and filtering the solution with a polytetrafluoroethylene membrane filter having a pore size of 0.2 micrometer (μm). A number average molecular weight and a weight average molecular weight of the sample are measured through gel permeation chromatography (GPC) of tetrahydrofuran as a mobile phase with a differential refractometer as a detector. Monodisperse polystyrene is used as a standard material of a molecular weight. Units for molecular weight as used herein are grams per mole (g/mol).

Glass Transition Temperature (Tg)

A glass transition temperature (Tg) of the sample is measured with a differential scanning calorimeter (DSC) by increasing a temperature up to about 300° C. at a temperature increase rate of about 10° C./min, maintaining the sample there for about 10 minutes, cooling it down to about 25° C. at a temperature decrease rate of about 10° C./min, maintaining there for about 10 minutes, and then, increasing the temperature up to about 300° C. at a temperature increase rate of about 10° C./min. After the measurement is complete, the sample is cooled to room temperature (about 25° C.) at about 10° C./min.

Measurement of Refractive Index (nD)

A refractive index of the composition is measured in the following method. DMAc is added to the composition to prepare a sol having a solid concentration of about 10 wt %, and the sol is cast on a polyimide film. Thereafter, the cast film is dried on a hot plate at 80° C. for 8 hours and then dried under vacuum at 80° C. for 24 hours to produce a film (film thickness 200 μm±10 μm). A refractive index of the obtained transparent film at a wavelength of about 473 nm, about 594 nm, and about 657 nm is measured with a prism coupler (Model 2010, Metricon Corp.). The measurements are used to calculate a refractive index at a d ray (587.6 nm). The refractive index of the polymer and the refractive index of the surface-treating agent are measured and calculated based on those of the composition.

Measurement of Total Light Transmittance and Haze

The total light transmittance and haze of a film are measured by using Haze Meter NDH5000 made by Suga Test Instrument Co., Ltd.

Measurement of Izod Impact Strength

In accordance with ASTM D256 (with notch), a specimen with a V-shaped notch is fixed in a vertical position and is hit by a hammer from the same side as the notch and destroyed. Fracture energy by a lift angle of the hammer and an elevation angle after hitting is obtained and the Izod impact strength (Joule per meter, J/m) is calculated by dividing it by a width of the specimen.

Synthesis of Each Component

Synthesis Example B1: Preparation of Zirconium Oxide Particulate (Dn50=3 nm)/Benzoguanamine/Dimethyl Acetamide Dispersion 100.00 parts by weight of a zirconium oxide/methanol/acetic acid dispersion (a number median diameter of primary particles: 3 nm, a refractive index of zirconium oxide: 2.1, a solid content (zirconium oxide): 30 wt %, SZR-M, Sakai Chemical Industry Co., Ltd.) and 4.00 parts by weight of benzoguanamine (refractive index: 1.700) as a surface-treating agent are put in a separable flask equipped with a stirrer and a thermometer and then stirred at 35° C. for 1 hour. Subsequently, the dispersion is concentrated by an evaporator until the solid content is 90 wt % and methanol and acetic acid are distilled and removed therefrom to obtain a white powder. The powder is washed with hexane and filtered to remove surplus acetic acid and benzoguanamine to obtain a white powder. The obtained powder is dispersed in dimethyl acetamide (DMAc) to prepare a DMAc dispersion having 30 wt % of a sum content (a solid content) of zirconium oxide particulate/benzoguanamine.

Synthesis Example 2: Preparation of Zirconium Oxide Particulate (Dn50=3 nm)/6-(Dibutylamino)-1,3,5-Triazine-2,4-dithiol/Dimethyl Acetamide Dispersion 100.00 parts by weight of a zirconium oxide/methanol/acetic acid dispersion (a number median diameter of primary particles: 3 nm, a refractive index of zirconium oxide: 2.1, a solid content (zirconium oxide): 30 wt %, SZR-M, Sakai Chemical Industry Co., Ltd.) and 4.00 parts by weight of 6-(dibutylamino)-1,3,5-triazine-2,4-dithiol (DBA-triazine-dithiol, DBA triazinedithiol) (refractive index: 1.622) as a surface-treating agent are put in a separable flask equipped with a stirrer and a thermometer and then stirred at 35° C. for 1 hour. Subsequently, the dispersion is concentrated by an evaporator until the solid content is 90 wt % and methanol and acetic acid are distilled and removed therefrom to obtain a white powder. The powder is washed with hexane and filtered to remove surplus acetic acid and 6-(dibutyl amino)-1,3,5-triazine-2,4-dithiol to obtain a white powder. The obtained powder is dispersed in N,N-dimethyl acetamide (DMAc) to prepare DMAc dispersion having 30 wt % of a sum content (a solid content) of zirconium oxide particulate/6-(dibutyl amino)-1,3,5-triazine-2,4-dithiol.

Synthesis Example 2: Synthesis of Triazine Ring-Containing Polymer [1]

2.00 grams (g) (8.46 millimoles, mmol) of 2-anilino-1,3,5-triazine-4,6-dithiol (ZISNET AF, Sankyo Kasei Co., Ltd.) is put in a 100 milliliters (mL) flask, 14 mL of pure water is added thereto, 1.69 mL of a 10 molar (M) NaOH aqueous solution is added thereto, and the mixture is heated at 70° C. 2.23 g (8.46 mmol) of α,α'-dibromo-p-xylene is dissolved in 15 mL of nitrobenzene, and the obtained solution is added to the aqueous solution. 123 milligrams (mg) of hexadecyltrimethyl ammonium bromide is added thereto, and the mixture is fervently stirred at 70° C. for 24 hours. The reaction solution is added to methanol in a dropwise fashion and reprecipitated to obtain a white triazine ring-containing polymer [1]. The obtained triazine ring-containing polymer [1] has a number average molecular weight: 60000, a weight average molecular weight: 125000, Tg: 125° C., and a refractive index (nD, 587.6 nm): 1.729.

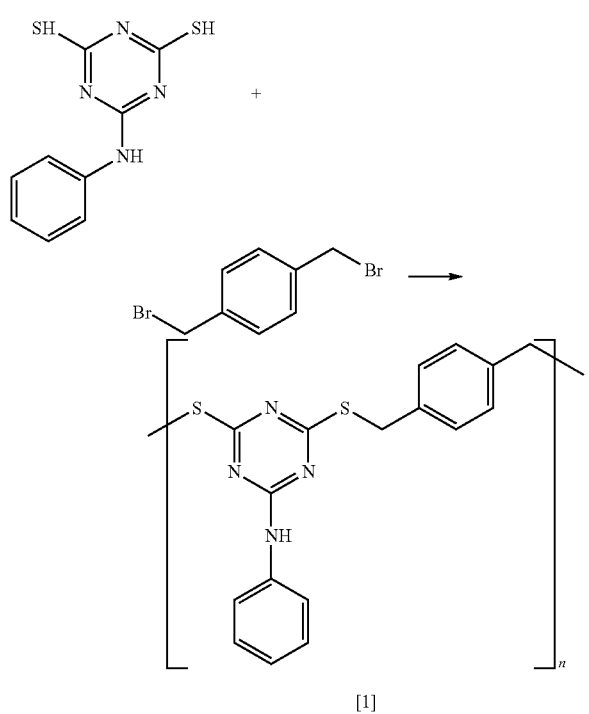

[1]

Synthesis Example 4: Preparation of Zirconium Oxide Particulate (Dn50=3 nm)/N-(2-Aminoethyl)-3-Aminopropyl Trimethoxysilane/Dimethyl Acetamide Dispersion 100.00 parts by weight of a zirconium oxide/methanol/acetic acid dispersion (a number median diameter of primary particles: 3 nm, a refractive index of zirconium oxide: 2.1, a solid content (zirconium oxide): 30 wt %, SZR-M, Sakai Chemical Industry Co., Ltd.) and 4.00 parts by weight of a silane coupling agent, N-(2-aminoethyl)-3-aminopropyl trimethoxysilane (KBM-603, refractive index: 1.441, Shin-Etsu Chemical Co., Ltd.) as a surface-treating agent are put in a separable flask equipped with a stirrer and a thermometer and then stirred at 35° C. for 1 hour. Subsequently, the dispersion is concentrated by an evaporator until the solid content is 90 wt % and methanol and acetic acid are distilled and removed therefrom to obtain white powder. The powder is washed with hexane and filtered to remove surplus acetic acid and N-(2-aminoethyl)-3-aminopropyl trimethoxysilane to obtain a white powder. The obtained powder is dispersed in N,N-dimethyl acetamide (DMAc) to prepare DMAc dispersion having 30 wt % of a sum content (a solid content) of zirconium oxide particulate//N-(2-aminoethyl)-3-aminopropyl trimethoxysilane.

Example 1

1.0 part by weight of the triazine ring-containing polymer [1] according to Synthesis Example 3 is dissolved in 9.0 parts by weight of DMAc, 3.0 parts by weight of the DMAc dispersion having 30 wt % of a sum content (a solid content) of zirconium oxide particulate/benzoguanamine according to Synthesis Example 1 is added thereto, and the mixture is stirred at room temperature (25° C.) for 1 hour to obtain a sol of an organic-inorganic hybrid composition. A film obtained by casting the sol and drying the same has a refractive index nD of 1.756, a total light transmittance of 85%, a haze of 2.8%, and Izod impact strength of 33 J/m.

Example 2

1.0 part by weight of the triazine ring-containing polymer [1] according to Synthesis Example 3 is dissolved in 9.0 parts by weight of DMAc, and 3.0 parts by weight of the DMAc dispersion having 30 wt % of a sum content (a solid content) of zirconium oxide particulate/6-(dibutylamino)-1,3,5-triazine-2,4-dithiol (DBA triazinedithiol) according to Synthesis Example 2 is added thereto, and the mixture is stirred at room temperature (25° C.) for 1 hour to obtain a sol of an organic-inorganic hybrid composition. A film obtained by casting the sol and drying the same has a refractive index nD of 1.757 a total light transmittance of 86%, a haze of 2.5%, and Izod Impact strength of 32 J/m.

Comparative Example 1

1.0 part by weight of HB-TmD-OH polymer disclosed in Japanese Patent No. 6020468 is dissolved in 9.0 parts by weight of DMAc, 3.0 parts by weight of the DMAc dispersion having 30 wt % of a sum content (a solid content) of zirconium oxide particulate/N-(2-aminoethyl)-3-aminopropyl trimethoxysilane according to Synthesis Example 4 is added thereto, and the mixture is stirred at room temperature (25° C.) for 1 hour to obtain a sol of an organic-inorganic hybrid composition. A film is obtained by casting the sol on a polyimide film but becomes opaque (murky) while a solvent therein is volatilized. The film becomes cloudy and thus optical properties are not measurable. The Izod impact strength is less than or equal to 5 J/m. When the following HB-TmD-OH polymer is synthesized according to a method disclosed in Japanese Patent No. 6020468, the number average molecular weight Mn of the obtained polymer is 30,000. In addition, the glass transition temperature of the obtained polymer is not measurable by DSC measurement.

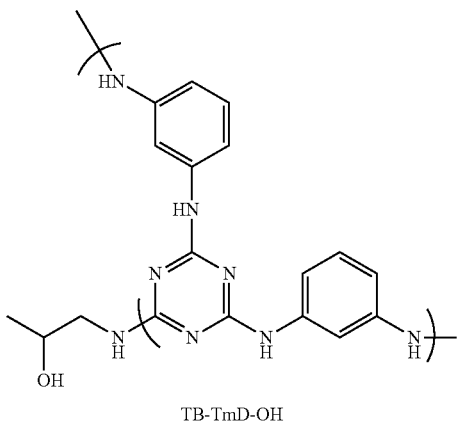

TB-TmD-OH

Comparative Example 2

1.0 part by weight of the triazine ring-containing polymer [1] according to Synthesis Example 3 is dissolved in 9.0 parts by weight of DMAc, and 3.0 parts by weight of the DMAc dispersion having 30 wt % of a sum content (a solid content) of zirconium oxide particulate/N-(2-aminoethyl)-3-aminopropyl trimethoxysilane according to Synthesis Example 4 is added thereto, and the mixture is stirred at room temperature (25° C.) for 1 hour to obtain a sol of an organic-inorganic hybrid composition. A film obtained by casting the sol and drying the same has a refractive index nD of 1.695, a total light transmittance of 69%, a haze of 20.1%, and Izod impact strength of less than or equal to 10 J/m.

Properties of the Examples and Comparative Examples are summarized in Table 1.

TABLE 1

| | Triazine ring-containing polymer (A) | Inorganic particulate (B) | Surface-treating agent (C) | | |
|---|---|---|---|---|---|
| | Polymer (Tg) | Type (Dn50) | Types | Molecular weight | Refractive index nD |
| Example 1 | [1] (125° C.) | ZrO$_2$ (3 nm) | Benzoguanamine | 187 | 1.700 |
| Example 2 | [1] (125° C.) | ZrO$_2$ (3 nm) | DBA triazine dithiol | 272 | 1.622 |
| Comparative Example 1 | HB-TmD-OH | ZrO$_2$ (3 nm) | N-(2-aminoethyl)-3-aminopropyl trimethoxysilane | 222 | 1.441 |
| Comparative Example 2 | [1] (125° C.) | ZrO$_2$ (3 nm) | N-(2-aminoethyl)-3-aminopropyl trimethoxysilane | 222 | 1.441 |

| | Organic-inorganic hybrid composition | | | |
|---|---|---|---|---|
| | Refractive index nD | Total light transmittance (%) | Haze (%) | Izod impact strength (J/m) |
| Example 1 | 1.756 | 85 | 2.8 | 33 |
| Example 2 | 1.757 | 86 | 2.5 | 32 |
| Comparative Example 1 | | Film becomes cloudy | | ≤5 |
| Comparative Example 2 | 1.695 | 69 | 20.1 | ≤10 |

As described above, the organic-inorganic hybrid compositions have a high refractive index, an improved transparency, and the articles have high strength. Thus, it is particularly appropriate for lens for a smart phone and the like.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. An organic-inorganic hybrid composition, comprising:
a polymer having a triazine ring structure in a main chain of the polymer (A);
an inorganic particulate (B); and
a surface-treating agent having a triazine ring structure represented by Formula (1) (C):

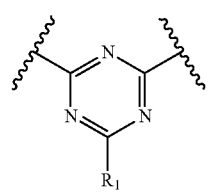

(1)

wherein, in Formula (1), R$_1$ is a carboxyl group, a phosphoric acid group, a sulfo group, or a substituted or unsubstituted alkyl group, a substituted or unsubstituted alkenyl group, a substituted or unsubstituted alkynyl group, a substituted or unsubstituted aryl group, a substituted or unsubstituted aralkyl group, or a substituted or unsubstituted amino group, wherein a number median diameter (Dn50) of the inorganic particulate (B) is greater than or equal to about 1 nanometer and less than or equal to about 20 nanometer, wherein "  " is a linking point to an adjacent atom.

2. The organic-inorganic hybrid composition of claim 1, wherein the surface-treating agent (C) is represented by Formula (2):

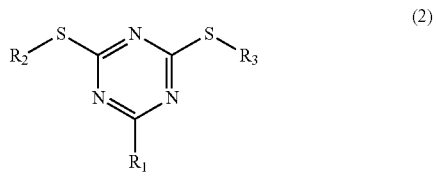

(2)

wherein, in Formula (2), R$_1$ is a carboxyl group, a phosphoric acid group, a sulfo group, a substituted or unsubstituted alkyl group, a substituted or unsubstituted alkenyl group, a substituted or unsubstituted alkynyl group, a substituted or unsubstituted aryl group, a substituted or unsubstituted aralkyl group, or a substituted or unsubstituted amino group, and R$_2$ and $R_3$ are each independently a hydrogen atom, a substituted or unsubstituted alkyl group or a substituted or unsubstituted aryl group.

3. The organic-inorganic hybrid composition of claim 1, wherein the surface-treating agent (C) is represented by Formula (3):

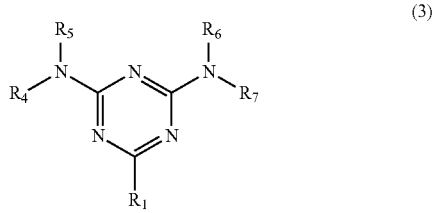

wherein, in Formula (3), $R_1$ is a carboxyl group, a phosphoric acid group, a sulfo group, or a substituted or unsubstituted alkyl group, a substituted or unsubstituted alkenyl group, a substituted or unsubstituted alkynyl group, a substituted or unsubstituted aryl group, a substituted or unsubstituted aralkyl group, or a substituted or unsubstituted amino group, and $R_4$, $R_5$, $R_6$, and $R_7$ are each independently a hydrogen atom, a substituted or unsubstituted alkyl group, or a substituted or unsubstituted aryl group.

4. The organic-inorganic hybrid composition of claim 1, wherein the surface-treating agent (C) has a molecular weight of greater than or equal to about 100 and less than about 20000.

5. The organic-inorganic hybrid composition of claim 1, wherein the surface-treating agent (C) has a refractive index of greater than or equal to about 1.6 and less than or equal to about 2.0.

6. The organic-inorganic hybrid composition of claim 1, wherein the polymer (A) has a number average molecular weight of greater than or equal to about 20000.

7. The organic-inorganic hybrid composition of claim 1, wherein the polymer (A) is a thermoplastic polymer having a glass transition temperature (Tg).

8. The organic-inorganic hybrid composition of claim 7, wherein the glass transition temperature of the polymer (A) is greater than or equal to about 80° Celsius and less than or equal to about 200° Celsius.

9. The organic-inorganic hybrid composition of claim 1, wherein the inorganic particulate (B) has a refractive index of greater than or equal to about 1.8 and less than or equal to about 3.5.

10. The organic-inorganic hybrid composition of claim 1, wherein the inorganic particulate (B) comprises a zirconium oxide, a titanium oxide, a barium titanate, a strontium titanate, a zinc oxide, a gallium phosphide, a cerium oxide, a niobium oxide, or a combination thereof.

11. The organic-inorganic hybrid composition of claim 1, wherein a sum content of the inorganic particulate (B) and the surface-treating agent (C) is greater than or equal to about 5 weight % and less than 80 weight % based on a sum content, 100 weight % of the polymer (A), the inorganic particulate (B) and the surface-treating agent (C).

12. The organic-inorganic hybrid composition of claim 1, wherein a refractive index nD (587.6 nanometer) is greater than or equal to about 1.7.

13. An article comprising the organic-inorganic hybrid composition of claim 1.

14. An optical component comprising the organic-inorganic hybrid composition of claim 1.

* * * * *